(12) United States Patent
Shinao et al.

(10) Patent No.: US 8,687,317 B1
(45) Date of Patent: Apr. 1, 2014

(54) SPINDLE MOTOR AND DISK DRIVE APPARATUS

(71) Applicant: Nidec Corporation, Kyoto (JP)

(72) Inventors: Takunori Shinao, Kyoto (JP); Yuichi Shigematsu, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/780,460

(22) Filed: Feb. 28, 2013

Related U.S. Application Data (60) Provisional application No. 61/705,264, filed on Sep. 25, 2012.

(51) Int. Cl.
*G11B 17/02* (2006.01)

(52) U.S. Cl.
USPC ........................................................ 360/99.08

(58) Field of Classification Search
USPC ........................................................ 360/99.08
See application file for complete search history.

(56) References Cited

U.S. PATENT DOCUMENTS

| | | | |
|---|---|---|---|
| 5,880,545 A | 3/1999 | Takemura et al. | |
| 6,456,458 B1 * | 9/2002 | Ichiyama | 360/99.08 |
| 6,671,125 B1 * | 12/2003 | Sumi | 360/99.08 |
| 6,954,017 B2 * | 10/2005 | Takahashi et al. | 310/85 |
| 6,991,376 B2 | 1/2006 | Aiello et al. | |
| 7,593,182 B2 * | 9/2009 | Tamaoka et al. | 360/99.08 |
| 7,913,269 B2 * | 3/2011 | Takaki et al. | 720/707 |
| 8,385,017 B2 * | 2/2013 | Mizukami et al. | 360/99.08 |
| 8,472,132 B2 * | 6/2013 | Yamada et al. | 360/99.08 |
| 8,520,335 B2 * | 8/2013 | Mizukami et al. | 360/99.08 |
| 2001/0038250 A1 | 11/2001 | Katagiri et al. | |
| 2004/0090702 A1 | 5/2004 | Aiello et al. | |
| 2006/0182374 A1 | 8/2006 | Schwamberger et al. | |
| 2007/0030591 A1 | 2/2007 | Engesser et al. | |
| 2007/0133911 A1 | 6/2007 | Nishimoto et al. | |
| 2007/0236091 A1 | 10/2007 | Fukushima | |
| 2008/0037918 A1 | 2/2008 | Hayakawa et al. | |
| 2008/0187257 A1 | 8/2008 | Engesser et al. | |
| 2008/0292228 A1 | 11/2008 | Yamashita et al. | |
| 2009/0140587 A1 | 6/2009 | Popov et al. | |
| 2010/0124387 A1 | 5/2010 | Fuss et al. | |
| 2010/0142869 A1 | 6/2010 | Grantz et al. | |
| 2010/0266225 A1 | 10/2010 | Yamashita et al. | |
| 2011/0192210 A1 | 8/2011 | Yamashita et al. | |
| 2012/0033325 A1 | 2/2012 | Mizukami et al. | |
| 2012/0033326 A1 | 2/2012 | Mizukami et al. | |
| 2012/0033327 A1 | 2/2012 | Mizukami et al. | |
| 2012/0033328 A1 | 2/2012 | Mizukami et al. | |

(Continued)

FOREIGN PATENT DOCUMENTS

| | | |
|---|---|---|
| DE | 10 2011 111 396 A1 | 2/2013 |
| JP | 08-275435 A | 10/1996 |
| JP | 2003-056555 A | 2/2003 |
| JP | 2003-061295 A | 2/2003 |

(Continued)

*Primary Examiner* — Mark Blouin (74) *Attorney, Agent, or Firm* — Keating & Bennett, LLP (57) ABSTRACT

A spindle motor includes a stationary portion and a rotating portion. The stationary portion includes a shaft and an upper annular member. The rotating portion includes a sleeve. The shaft includes an annular or substantially annular upper shaft recessed portion recessed radially inward from an outside surface of the shaft. The upper shaft recessed portion is arranged opposite to an inside surface of a hole of the upper annular member. An adhesive is arranged in a gap defined between the upper shaft recessed portion and the inside surface of the hole of the upper annular member.

25 Claims, 7 Drawing Sheets

(56) References Cited

U.S. PATENT DOCUMENTS

| | | |
|---|---|---|
| 2012/0033329 A1 | 2/2012 | Mizukami et al. |
| 2012/0063030 A1* | 3/2012 | Yamada et al. ............ 360/99.08 |
| 2012/0200957 A1* | 8/2012 | Yawata ...................... 360/99.08 |
| 2012/0243397 A1 | 9/2012 | Yamamoto et al. |
| 2012/0250183 A1 | 10/2012 | Tamaoka et al. |
| 2012/0327534 A1 | 12/2012 | Yamaguchi et al. |

FOREIGN PATENT DOCUMENTS

| | | |
|---|---|---|
| JP | 2006-105390 A | 4/2006 |
| JP | 2007-162759 A | 6/2007 |
| JP | 2009-136143 A | 6/2009 |
| JP | 2010-121775 A | 6/2010 |
| JP | 2012-257428 A | 12/2012 |
| KR | 10-2010-0064349 A | 6/2010 |

* cited by examiner

SPINDLE MOTOR AND DISK DRIVE APPARATUS

BACKGROUND OF THE INVENTION

1. Field of the Invention

The present invention relates to a spindle motor and more specifically to a disk drive apparatus using the spindle motor.

2. Description of the Related Art

Some known motors of disk drive apparatuses include bearing mechanisms using fluid dynamic pressure. In some spindle motors (hereinafter referred to simply as "motors"), a gap is defined between an annular member fixed to a shaft portion and a sleeve portion of a rotating portion positioned below the annular member. In some such motors, a seal portion having a surface of a lubricating oil defined therein is defined around the annular member. The seal portion is, for example, covered with a cap member fixed to the annular member.

When the annular member is press fitted to the shaft portion during assemblage of the motor, an outer circumferential surface of the shaft portion or an inner circumferential surface of the annular member may become flawed. If a flaw occurs, the lubricating oil in the gap defined between the annular member and the sleeve portion may leak upwardly out of the annular member through the flaw. Therefore, an operation of sealing a gap between the annular member and the shaft portion is required. Accordingly, there is a demand for a structure designed to easily prevent the lubricating oil from leaking out through the gap between the annular member and the shaft portion.

SUMMARY OF THE INVENTION

A spindle motor according to preferred embodiments of the present invention includes a stationary portion including a stator; and a rotating portion including a rotor magnet, and rotatably supported through a lubricating oil. The stationary portion includes a shaft and an upper annular member. The shaft is centered on a central axis extending in a vertical direction. The upper annular member is arranged on an axially upper portion of the shaft, and includes a hole through which the shaft is inserted. The rotating portion includes a sleeve including a central hole through which the shaft is inserted.

The shaft includes a annular or substantially annular upper shaft recessed portion. The upper shaft recessed portion is defined in an outside surface of the shaft, is arranged opposite to an inside surface of the hole of the upper annular member, and is recessed radially inward from the outside surface of the shaft.

The lubricating oil is arranged over an inside surface of the central hole, the outside surface of the shaft, and a circumference of the upper annular member.

An adhesive is arranged in a gap defined between the upper shaft recessed portion and the inside surface of the hole of the upper annular member.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
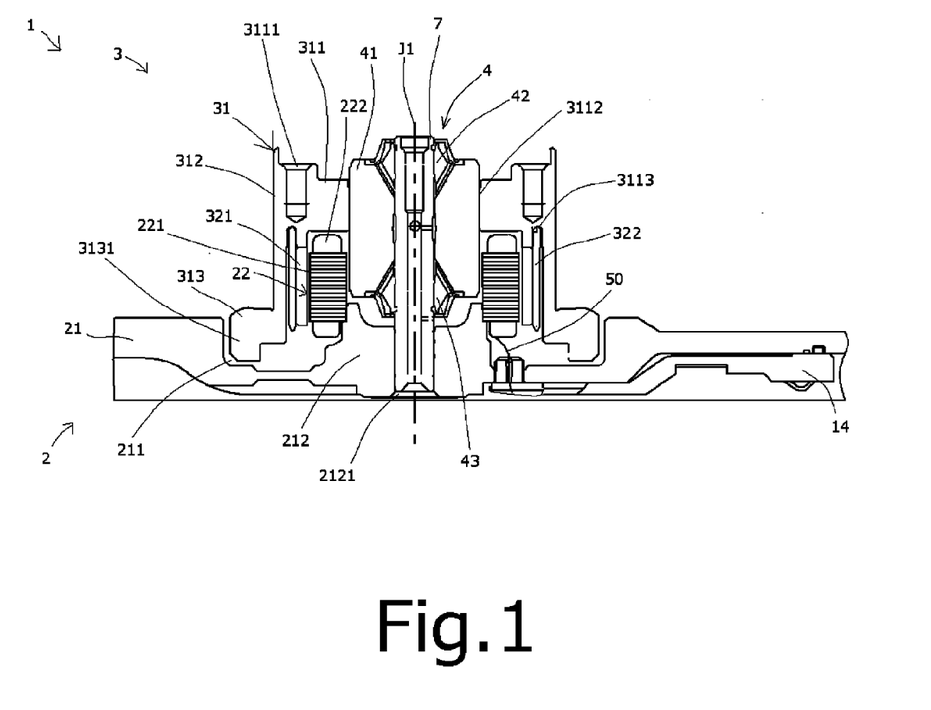
FIG. 1 is a cross-sectional view of a motor according to a preferred embodiment of the present invention.

It is assumed herein that an upper side and a lower side along a central axis of a motor in FIG. 1 are referred to simply as an "upper side" and a "lower side", respectively. It should be noted, however, that the above definitions of the upper and lower sides are not meant to indicate relative positions or directions of different members or portions when they are actually installed in a device. Also note that a direction parallel or substantially parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a cross-sectional view of a spindle motor 1 according to a preferred embodiment of the present invention. In the following description, the spindle motor 1 will be referred to simply as the motor 1. The motor 1 is preferably used in a disk drive apparatus (for example, a hard disk drive apparatus) or the like. The disk drive apparatus preferably includes the motor 1, a housing, at least one disk, an access portion, a connector, and so on. The disk(s) is attached to the motor 1. The access portion is arranged to perform at least one of reading and writing of information from or to the disk(s). A base portion 21 defines a portion of the housing together with a cover member. The housing is arranged to contain the motor 1, the disk(s), the access portion, and so on.

As illustrated in FIG. 1, the motor 1 is preferably an outer-rotor motor. The motor 1 according to the present preferred embodiment is preferably a three-phase motor, having three phases, i.e., a U phase, a V phase, and a W phase. The motor 1 preferably includes a stationary portion 2, which is a stationary assembly, a rotating portion 3, which is a rotating assembly, and a fluid dynamic bearing mechanism (hereinafter referred to as a "bearing mechanism 4"). The rotating portion 3 is supported by the bearing mechanism 4 such that the rotating portion 3 is rotatable about a central axis J1 of the motor 1 with respect to the stationary portion 2.

The stationary portion 2 preferably includes the base portion 21, an annular stator 22, a circuit board 14, and a shaft 7. The base portion 21 is preferably a substantially plate-shaped member. The base portion 21 includes a first recessed portion 211 arranged to be recessed axially downward. A bottom portion of the first recessed portion 211 is arranged at an axial height lower than an axial height of an upper surface of the base portion 21. The base portion 21 includes a substantially cylindrical tubular portion 212. The tubular portion 212 is arranged radially inside the first recessed portion 211, and is arranged to extend axially upward. The tubular portion 212 includes a first through hole 2121 passing therethrough in an axial direction.

The shaft 7 is substantially columnar. The shaft 7 is inserted into the first through hole 2121 of the tubular portion 212. The shaft 7 is fixed to the tubular portion 212 preferably through, for example, press fitting, adhesion, or the like. In other words, the shaft 7 is fixed to the base portion 21.

The stator 22 preferably includes a stator core 221 and coils 222. The coils 222 are arranged on the stator core 221. In the stator 22, a plurality of lead wires 50 are drawn out of the coils 222 of the U, V, and W phases. Each of the plurality of lead wires 50 is electrically connected to the circuit board 14. Each lead wire 50 is preferably connected to the circuit board 14 by soldering, for example. In the present preferred embodiment, the number of lead wires 50 is three. The circuit board 14 may include a connector or the like.

The stator core 221 includes a core back (not shown) and a plurality of teeth (not shown). The stator core is defined, for example, by a plurality of electromagnetic steel sheets placed one upon another. The core back is annular and centered on the central axis J1. The core back is arranged in the shape of a tube extending in the axial direction. The teeth are arranged to extend radially outward from an outside surface of the core back. Each of the teeth includes a winding portion and a tip portion. A conducting wire is wound around the winding portion to define the coil 222. The tip portion is arranged to extend to both sides in a circumferential direction from an outer edge portion of the winding portion.

At least a portion of the tubular portion 212 is inserted in a hole of the core back. In more detail, an axially upper top portion of the tubular portion 212 is inserted in a hole defined by an inside surface of the core back. The inside surface of the core back is arranged radially opposite at least a portion of an outside surface of the tubular portion. The stator core 221 is preferably fixed to the tubular portion 212 through, for example, press fitting, adhesion, or the like.

As illustrated in FIG. 1, the rotating portion 3 preferably includes a rotor hub 31, a rotor magnet 321, and a yoke 322. The rotor hub 31 preferably includes a hub body 311, a cylindrical portion 312, and an annular disk mount portion 313. The hub body 311 is preferably substantially in the shape of a plate. The hub body 311 preferably includes a plurality of fitting holes 3111. When the disk drive apparatus is assembled, a top cover of a case is fixed to the hub body 311 through fixing members, such as, for example, screws, pins, small screws, bolts, or the like. That is, the fixing members are inserted into the fitting holes. In addition, the hub body 311 includes a bearing holding hole 3112 passing through the hub body 311 in the axial direction. A sleeve 41, which will be described below, is inserted into the bearing holding hole 3112 and held therein. The sleeve 41 is fixed to the bearing holding hole 3112 preferably through, for example, press fitting, an adhesive, or the like. Moreover, the shaft 7 is passed through the bearing holding hole 3112 through the sleeve 41. An axially upper end portion of the shaft 7 is positioned at an axial height higher than an axial height of an opening end portion of the bearing holding hole 3112.

The cylindrical portion 312 is arranged to project downward from an outer edge portion of the hub body 311. The disk mount portion 313 is arranged to extend radially outward from a lower portion of the cylindrical portion 312. The disk is mounted on the disk mount portion 313. The rotor magnet 321 is preferably annular or substantially annular and centered on the central axis J1. The yoke 322, which is tubular and made of, for example, a metal, is arranged radially inside the cylindrical portion 312. An axially lower surface of the hub body 311 includes a groove 3113 recessed axially upward defined therein. The groove 3113 is defined in an annular shape. The yoke is held in the groove 3113 of the hub body 311. The rotor magnet 321 is arranged inside the cylindrical portion 312, and is arranged radially inward of the yoke 322. The disk mount portion 313 is positioned radially outside a lower portion of the rotor magnet 321. A lower end projecting portion 3131 extending axially downward is arranged in a radially outer portion of the disk mount portion 313. The lower end projecting portion 3131 is preferably annular or substantially annular. An inside surface of the first recessed portion 211 is arranged radially opposite an outside surface of the lower projecting portion 3131. The rotor magnet 321 is arranged radially outside the stator 22. In the motor 1, a torque is produced between the rotor magnet 321 and the stator 22. This enables the rotating portion 3 to rotate relative to the stationary portion 2.

Note that a substantially annular balancing ring may be arranged on an inside surface of the lower projecting portion 3131 id so desired. This makes it possible to correct any unbalance in the rotating portion 3 during a process of assembling the motor 1.

Figure 2:
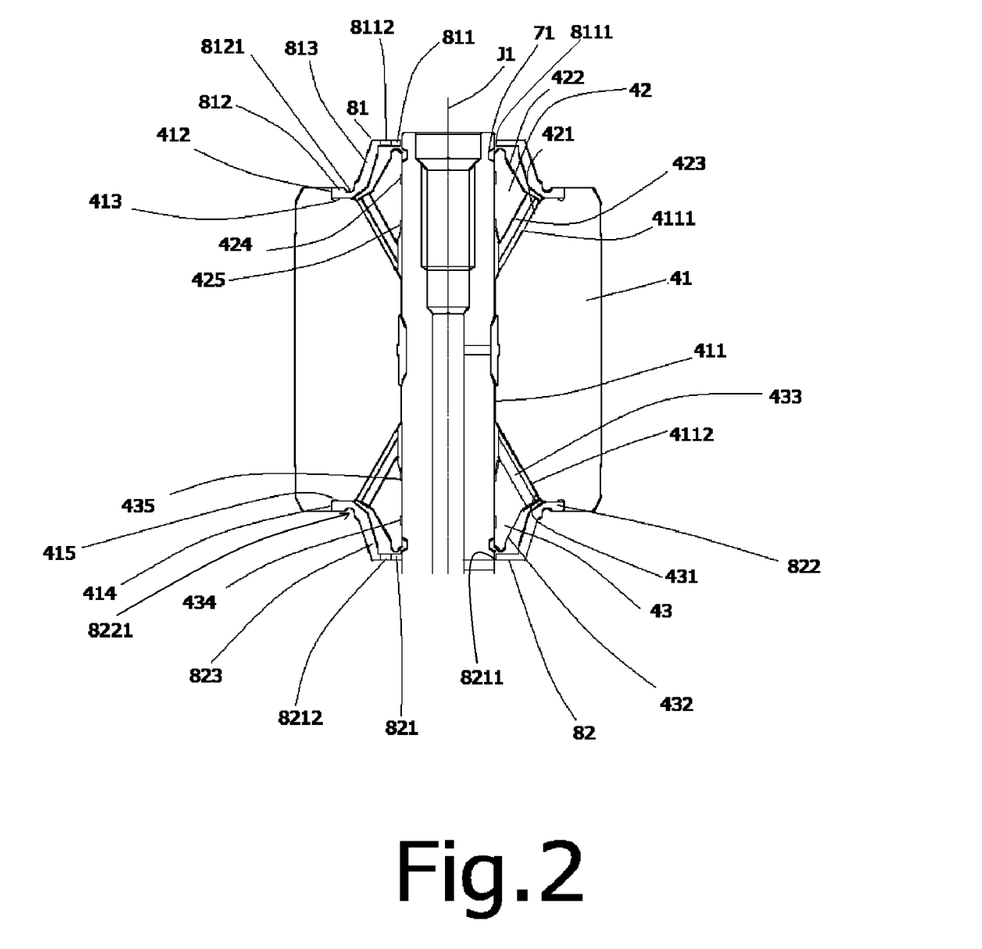
FIG. 2 is a cross-sectional view of a bearing and an adjacent area according to a preferred embodiment of the present invention.
Figure 3:
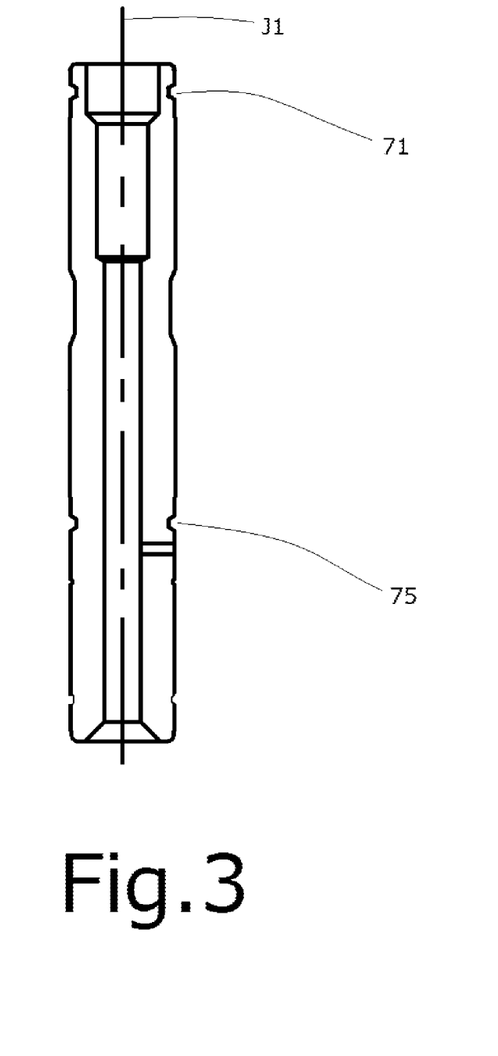
FIG. 3 is a cross-sectional view of a shaft according to a preferred embodiment of the present invention.

FIG. 2 is a cross-sectional view of the bearing mechanism 4 and an adjacent area. FIG. 3 is a cross-sectional view of the shaft 7. As illustrated in FIGS. 1 and 2, the bearing mechanism 4 is a fluid dynamic bearing. The bearing mechanism 4 preferably includes a lubricating oil, the sleeve 41, an upper cone member 42, and a lower cone member 43. The sleeve 41 is preferably a substantially cylindrical member. The sleeve is preferably made, for example, of stainless steel. The sleeve 41 includes a central hole 411 passing through the sleeve 41 in a vertical direction. The shaft 7 is passed through the central hole 411. The lubricating oil travels over an inside surface of the central hole 411, an outside surface of the shaft, a circumference of the upper cone member 42, a circumference of the lower cone member 43, and so on. The sleeve 41 is able to support the shaft 7. When the rotating portion 3 rotates with respect to the stationary portion 2, the sleeve 41 rotates relative to the shaft 7 with the lubricating oil intervening therebetween.

A sleeve upper inclined surface 4111 is preferably arranged in an axially upper portion of the inside surface defining the central hole 411. The sleeve upper inclined surface 4111 is inclined with respect to the central axis J1. The radial distance between the sleeve upper inclined surface 4111 and the central axis J1 gradually increases with increasing height. The axially upper end portion of the shaft 7 is arranged at an axial height higher than an axial height of the sleeve upper inclined surface 4111.

A sleeve lower inclined surface 4112 is preferably arranged in an axially lower portion of the inside surface defining the central hole 411. The sleeve lower inclined surface is inclined with respect to the central axis J1. The radial distance between the sleeve lower inclined surface 4112 and the central axis J1 gradually increases with decreasing height. An axially lower end portion of the shaft 7 is arranged at an axial height lower than an axial height of the sleeve lower inclined surface 4112.

The upper cone member 42, which is an exemplary upper annular member, is arranged on an axially upper portion of the shaft 7. The upper cone member 42 is a substantially tubular member. An upper first inclined surface 421, which is inclined with respect to the central axis J1, is arranged in an axially lower portion of an outside surface of the upper cone member 42. The radial distance between the upper first inclined surface 421 and the central axis J1 gradually increases with increasing height. The upper first inclined surface 421 is arranged opposite to the sleeve upper inclined surface 4111.

An upper second inclined surface 422, which is inclined with respect to the central axis J1, is arranged in an axially upper portion of the outside surface of the upper cone member 42. The radial distance between the upper second inclined surface 422 and the central axis J1 gradually decreases with increasing height.

The upper cone member 42 includes an upper communicating hole 423. The upper communicating hole 423 is arranged to provide communication between the upper second inclined surface 422 and an inside surface of the upper cone member 42. A direction in which an inside surface defining the upper communicating hole 423 extends is preferably parallel or substantially parallel to the upper first inclined surface 421. The direction in which the inside surface defining the upper communicating hole 423 extends is preferably parallel or substantially parallel to the sleeve upper inclined surface 4111. The cross-sectional area of an opening end portion of the upper communicating hole 423 on the upper second inclined surface is arranged to be smaller than the cross-sectional area of an opening end portion of the upper communicating hole 423 on the inside surface of the upper cone member 42.

An upper first inner recessed portion 424 extending in the circumferential direction is arranged in the inside surface of the upper cone member 42. An upper second inner recessed portion 425 is arranged in the inside surface of the upper cone member 42 on an axially lower side of the upper first inner recessed portion 424. The upper second inner recessed portion 425 extends in the circumferential direction. A direction in which the upper first inner recessed portion 424 extends is parallel or substantially parallel to a direction in which the upper second inner recessed portion 425 extends.

The lower cone member 43, which is an exemplary lower annular member, is arranged on an axially lower portion of the shaft 7. The lower cone member 43 is preferably a substantially tubular member. A lower first inclined surface 431, which is inclined with respect to the central axis J1, is preferably arranged in an axially upper portion of an outside surface of the lower cone member 43. The radial distance between the lower first inclined surface 431 and the central axis J1 gradually increases with decreasing height. The lower first inclined surface 431 is arranged opposite to the sleeve lower inclined surface 4112.

A lower second inclined surface 432, which is inclined with respect to the central axis J1, is preferably arranged in an axially lower portion of the outside surface of the lower cone member 43. The radial distance between the lower second inclined surface 432 and the central axis J1 gradually decreases with decreasing height.

The lower cone member 43 preferably includes a lower communicating hole 433. The lower communicating hole 433 is arranged to provide communication between the lower second inclined surface 432 and an inside surface of the lower cone member 43. A direction in which an inside surface defining the lower communicating hole 433 extends is preferably parallel or substantially parallel to the lower first inclined surface 431. The direction in which the inside surface defining the lower communicating hole 433 extends is preferably parallel or substantially parallel to the sleeve lower inclined surface 4112. The cross-sectional area of an opening end portion of the lower communicating hole 433 on the lower second inclined surface 432 is arranged to be smaller than the cross-sectional area of an opening end portion of the lower communicating hole 433 on the inside surface of the lower cone member 43.

A lower first inner recessed portion 434 extending in the circumferential direction is preferably arranged in the inside surface of the lower cone member 43. A lower second inner recessed portion 435 is preferably arranged in the inside surface of the lower cone member 43 on an axially upper side of the lower first inner recessed portion 434. The lower second inner recessed portion 435 extends in the circumferential direction. A direction in which the lower first inner recessed portion 434 extends is parallel or substantially parallel to a direction in which the lower second inner recessed portion 435 extends.

An upper cap member 81 is arranged on an axially upper end surface of the sleeve 41. The upper cap member 81 is a substantially cylindrical member. The upper cap member 81 preferably includes an upper cover portion 811, an upper flange portion 812, and an upper joining portion 813. The upper cover portion 811 is substantially in the shape of a plate, and includes, at its center, an upper shaft through hole 8111 through which the shaft 7 is passed. An inside surface of the upper shaft through hole 8111 is arranged opposite to the outside surface of the shaft 7 with a gap intervening therebetween. The upper cover portion 811 further includes an upper small through hole 8112. The upper small through hole 8112 passes through the upper cover portion 811 in the axial direction. When the motor 1 is assembled, the lubricating oil is injected into the bearing mechanism 4 through the upper small through hole 8112.

The upper joining portion 813 is arranged to extend radially outward from the upper cover portion 811. The upper joining portion 813 is inclined with respect to the central axis J1. The radial distance between the central axis J1 and the upper joining portion 813 gradually increases with decreasing height.

The upper flange portion 812 connects with a radially outer end portion of the upper joining portion 813. An annular upper shoulder portion 412 is arranged in the axially upper end surface of the sleeve 41. Further, an upper groove 413 extending in the circumferential direction is arranged in the upper shoulder portion 412. The upper flange portion 812 is arranged both axially and radially opposite an axially upper end portion of the sleeve 41. The upper flange portion 812 is preferably arranged on the upper shoulder portion 412 through, for example, an adhesive. The adhesive enters into the upper groove 413. An upper recessed portion 8121 extending in the circumferential direction is arranged on an axially upper side of the upper flange portion 812. This reduces a stress at a junction of the upper joining portion 813 with the upper flange portion 812.

A lower cap member 82 is arranged on an axially lower end surface of the sleeve 41. The lower cap member 82 is a substantially cylindrical member. The lower cap member 82 preferably includes a lower cover portion 821, a lower flange portion 822, and a lower joining portion 823. The lower cover portion 821 is substantially in the shape of a plate, and includes, at its center, a lower shaft through hole 8211 through which the shaft 7 is passed. An inside surface of the lower shaft through hole 8211 is arranged opposite to the outside surface of the shaft 7 with a gap intervening therebetween. The lower joining portion 823 is arranged to extend radially outward from the lower cover portion 821. Further, the lower cover portion 821 includes a lower small through hole 8212. The lower small through hole 8212 passes through the lower cover portion 821 in the axial direction. When the motor 1 is assembled, the lubricating oil is injected through the lower small through hole 8212.

The lower joining portion 823 is inclined with respect to the central axis J1. The radial distance between the central axis J1 and the lower joining portion 823 gradually decreases with decreasing height. The lower flange portion 822 connects with a radially outer end portion of the lower joining portion 823. An annular lower shoulder portion 414 is arranged in an axially lower end surface of the sleeve 41. Further, a lower groove 415 extending in the circumferential direction is preferably arranged in the lower shoulder portion 414. The lower flange portion 822 is arranged both axially and radially opposite an axially lower end portion of the sleeve 41. The lower flange portion 822 is arranged on the lower shoulder portion 414 preferably through, for example, an adhesive. The adhesive enters into the lower groove 415. A lower recessed portion 8221 extending in the circumferential direction is arranged on an axially lower side of the lower flange portion 822. This reduces a stress at a junction of the lower joining portion 823 with the lower flange portion 822.

As illustrated in FIGS. 1, 2, and 3, an upper shaft recessed portion 71, which is recessed radially inward, is arranged in an outside surface of the axially upper end portion of the shaft 7. The upper shaft recessed portion 71 is substantially annular and extends in the circumferential direction. A hole into which a fixing member is inserted is preferably arranged in the axially upper end portion of the shaft 7. When the disk drive apparatus has been assembled, the cover of the case is fixed to the shaft 7 through the fixing member. A screw, a small screw, a pin, a bolt, or the like, for example, is preferably used as the fixing member.

Figure 4:
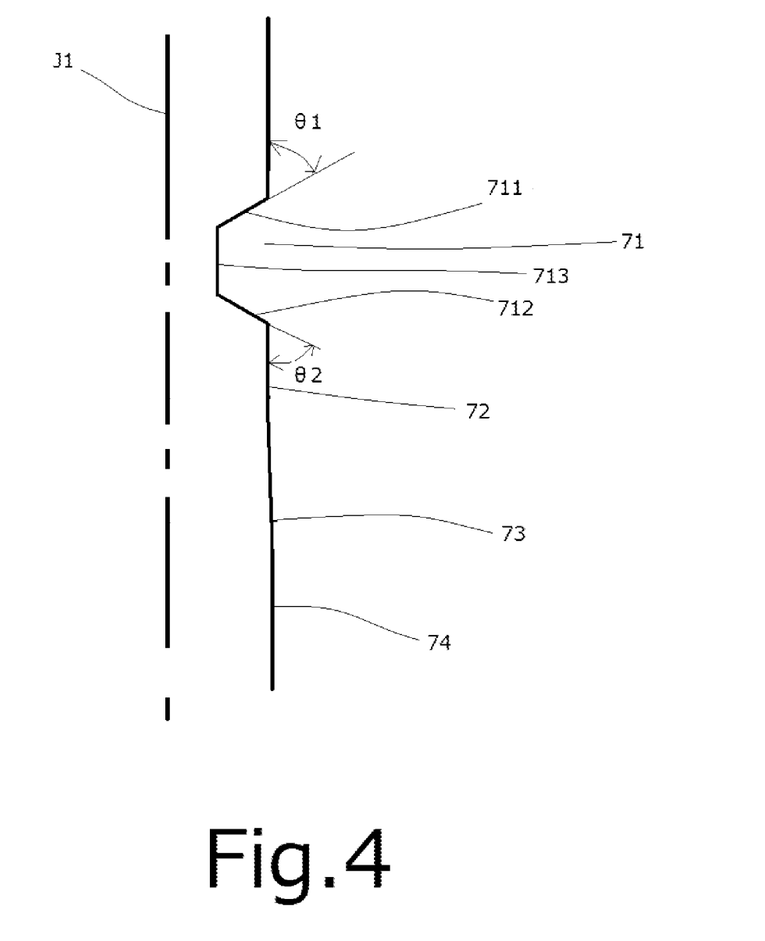
FIG. 4 is an enlarged view of a portion of an outside surface of the shaft according to a preferred embodiment of the present invention.

FIG. 4 is a partial enlarged view of the upper shaft recessed portion 71. As illustrated in FIG. 4, the upper shaft recessed portion 71 preferably includes an upper first axial side surface 711, an upper second axial side surface 712, and a radial bottom portion 713. The upper first axial side surface 711 is inclined with respect to the central axis J1. The upper first axial side surface 711 connects with the radial bottom portion 713. The radial bottom portion 713 connects with the upper second axial side surface 712. The upper second axial side surface 712 is arranged axially opposite the upper first axial side surface 711. The upper second axial side surface 712 is inclined with respect to the central axis J1. An angle θ1 defined between the central axis J1 and the upper first axial side surface 711 is preferably arranged to be equal or substantially equal to an angle θ2 defined between the central axis J1 and the upper second axial side surface 712.

Note that the angle θ1 defined between the central axis J1 and the upper first axial side surface 711 and the angle θ2 defined between the central axis J1 and the upper second axial side surface 712 may be different from each other.

The outside surface of the shaft 7 preferably includes an upper first outside diameter portion 72 connecting with an end portion of the upper second axial side surface 712. The upper first outside diameter portion 72 is a portion of the shaft 7 where the outside diameter of the shaft 7 is arranged to be substantially constant.

The outside surface of the shaft 7 includes an upper second outside diameter portion 73 arranged on an axially lower side of the upper first outside diameter portion 72. The upper second outside diameter portion 73 connects with the upper first outside diameter portion 72. The radial distance between the central axis J1 and the upper second outside diameter portion 73 (i.e., the outside diameter) is arranged to vary with increasing or decreasing height. In more detail, the radial distance between the central axis J1 and the upper second outside diameter portion 73 is arranged to gradually increase with decreasing height. The outside diameter of the shaft 7 in the upper first outside diameter portion 72 is preferably equal or substantially equal to a minimum outside diameter of the shaft 7 in the upper second outside diameter portion 73. The axial length of the upper first outside diameter portion 72 is arranged to be shorter than the axial length of the upper second outside diameter portion 73.

The outside surface of the shaft 7 preferably includes an upper third outside diameter portion 74 connecting with the upper second outside diameter portion 73. The outside diameter of the shaft 7 is preferably arranged to be substantially constant in the upper third outside diameter portion 74. A maximum outside diameter of the shaft 7 in the upper second outside diameter portion 73 is preferably equal or substantially equal to the outside diameter of the shaft 7 in the upper third outside diameter portion 74.

Figure 5:
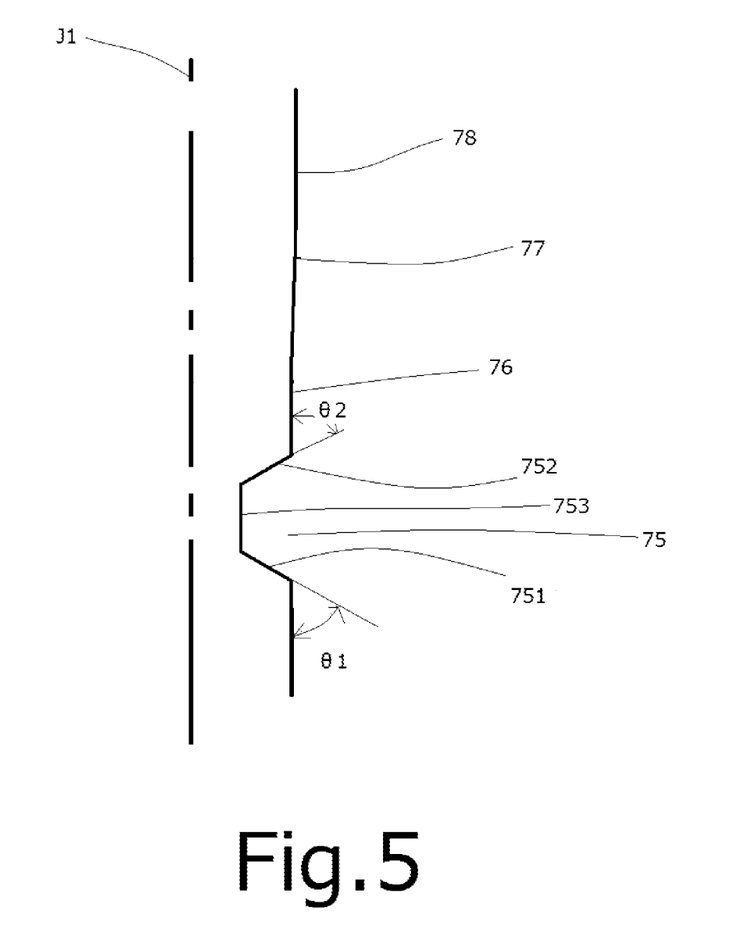
FIG. 5 is an enlarged view of a portion of the outside surface of the shaft according to a preferred embodiment of the present invention.

As illustrated in FIGS. 3 and 5, a lower shaft recessed portion 75, which is recessed radially inward, is preferably arranged in an outside surface of the axially lower end portion of the shaft 7. A hole into which a fixing member can be inserted is also preferably arranged in the axially lower end portion of the shaft 7, as in the axially upper end portion of the shaft 7.

The lower shaft recessed portion 75 preferably includes a lower first axial side surface 751, a lower second axial side surface 752, and a lower radial bottom portion 753. The lower first axial side surface 751 is inclined with respect to the central axis J1. The lower first axial side surface 751 connects with the lower radial bottom portion 753. The lower radial bottom portion 753 connects with the lower second axial side surface 752. The lower second axial side surface 752 is arranged axially opposite the lower first axial side surface 751. The lower second axial side surface 752 is inclined with respect to the central axis J1. An angle defined between the central axis J1 and the lower first axial side surface 751 is equal to the angle θ1 defined between the central axis J1 and the upper first axial side surface 711. An angle defined between the central axis J1 and the lower second axial side surface 752 is equal to the angle θ2 defined between the central axis J1 and the upper second axial side surface 712.

Note that the angle defined between the central axis J1 and the lower first axial side surface 751, the angle defined between the central axis J1 and the upper first axial side surface 711, the angle defined between the central axis J1 and the lower second axial side surface 752, and the angle θ2 defined between the central axis J1 and the upper second axial side surface 712 may be different from one another, or any pair of the above angles may be the same.

The outside surface of the shaft 7 preferably includes a lower first outside diameter portion 76 connecting with an end portion of the lower second axial side surface 752. The lower first outside diameter portion 76 is a portion of the shaft 7 where the outside diameter of the shaft 7 is arranged to be substantially constant.

The outside surface of the shaft 7 preferably includes a lower second outside diameter portion 77 arranged on an axially upper side of the lower first outside diameter portion 76. The lower second outside diameter portion 77 connects with the lower first outside diameter portion 76. The radial distance between the central axis J1 and the lower second outside diameter portion 77 (i.e., the outside diameter) is arranged to vary with increasing or decreasing height. In more detail, the radial distance between the central axis J1 and the lower second outside diameter portion 77 is arranged to gradually increase with increasing height. The outside diameter of the shaft 7 in the lower first outside diameter portion 76 is preferably equal or substantially equal to a minimum outside diameter of the shaft 7 in the lower second outside diameter portion 77.

The outside surface of the shaft 7 preferably includes a lower third outside diameter portion 78 connecting with the lower second outside diameter portion 77. The outside diameter of the shaft 7 is preferably arranged to be constant or substantially constant in the lower third outside diameter portion 78. A maximum outside diameter of the shaft 7 in the lower second outside diameter portion 77 is substantially equal to the outside diameter of the shaft 7 in the upper third outside diameter portion 78.

Note that the outside diameter in the upper third outside diameter portion 74 and the outside diameter in the lower third outside diameter portion 78 may be either the same or different from each other.

Figure 6:
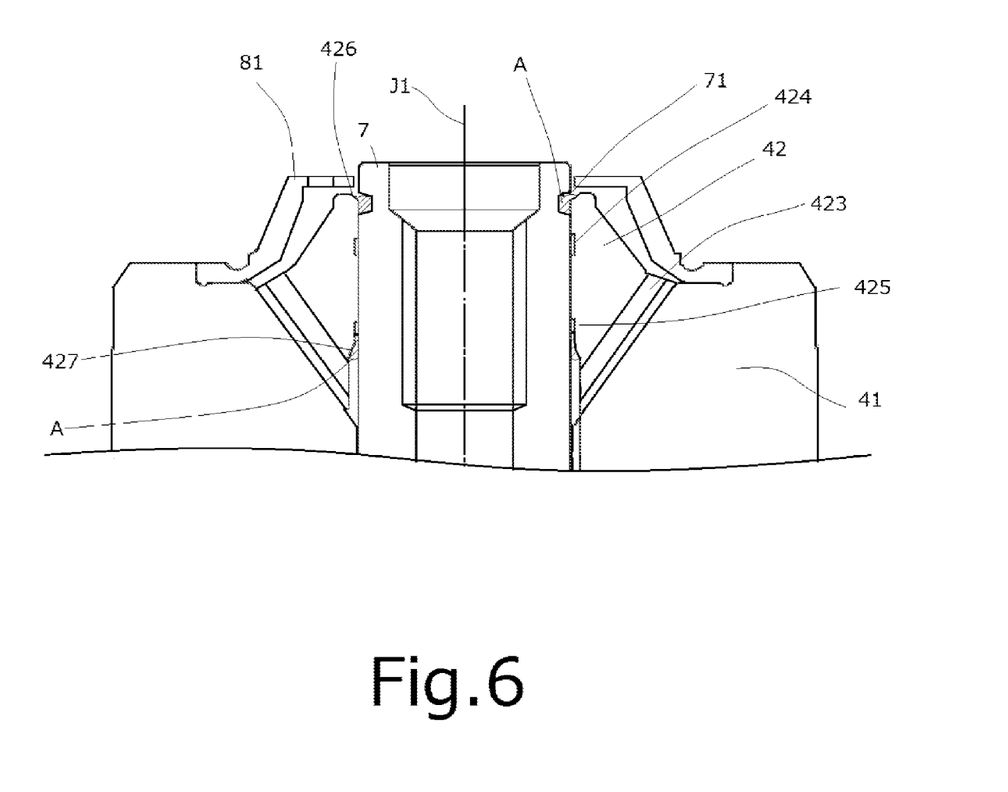
FIG. 6 is an enlarged view of a portion of the bearing and an adjacent area according to a preferred embodiment of the present invention.

FIG. 6 is an enlarged view of a portion of the bearing mechanism 4 and an adjacent area. As illustrated in FIGS. 1, 2, and 6, the upper shaft recessed portion 71 is arranged radially opposite an axially upper end portion of the upper cone member 42. The inside diameter of the upper cone member 42 is arranged to be smaller than the outside diameter of the shaft 7. Therefore, the upper cone member 42 is preferably fixed to the shaft 7 through, for example, press fitting once the shaft 7 is inserted into a hole of the upper cone member 42 during assemblage of the motor 1.

Moreover, an adhesive is preferably previously applied to an inside surface of the hole of the upper cone member 42 or the outside surface of the shaft 7 during the assemblage of the motor 1. The shaft 7 is thereafter, for example, press fitted into the hole of the upper cone member 42. Accordingly, at least a portion of the adhesive is arranged between the inside surface of the hole of the upper cone member 42 and the outside surface of the shaft 7. That is, the upper cone member 42 is fixed to the shaft 7 through adhesion as well.

In a process of inserting the shaft 7 into the hole of the upper cone member 42 in accordance with a preferred embodiment of the present invention, a portion of the adhesive arranged between the outside surface of the shaft 7 and the inside surface of the hole of the upper cone member 42 travels axially upward or axially downward along the outside surface of the shaft 7 or the inside surface of the hole of the upper cone member 42.

As illustrated in FIG. 6, at least a portion of a portion of the adhesive which has traveled axially upward is arranged in a gap defined between the upper shaft recessed portion 71 and the inside surface of the hole of the upper cone member 42. In the gap between the upper shaft recessed portion 71 and the upper cone member 42, a surface of the adhesive A is preferably arranged at an axial height lower than an axial height of an axially upper end of the upper cone member 42. In other words, the axially upper end of the upper cone member 42 is positioned higher than the surface of the adhesive A. Note that the adhesive is preferably arranged to extend all the way around a circumference of the upper shaft recessed portion 71 in the above gap.

Note that the axially upper end portion of the upper cone member 42 preferably includes an upper tapered surface 426 which is inclined with respect to the central axis J1. The upper tapered surface 426 is arranged radially opposite the upper shaft recessed portion 71. The radial distance between the central axis J1 and the upper tapered surface 426 is arranged to gradually increase with increasing height. Furthermore, the upper tapered surface 426 is preferably arranged to extend all the way around an inner circumference of the axially upper end portion of the upper cone member 42.

Furthermore, a junction of the upper tapered surface 426 with the inside surface of the upper cone member 42 is arranged at an axial height lower than an axial height of the surface of the adhesive A. That is, an axially lower end of the upper tapered surface 426 is arranged at an axial height lower than an axial height of the surface of the adhesive A.

The adhesive A arranged in the gap between the upper shaft recessed portion 71 and the upper cone member 42 closes at least a portion of a gap defined between the inside surface of the hole of the upper cone member 42 and the outside surface of the shaft 7. As a result, even if the lubricating oil travels from a vicinity of an axial middle portion of the shaft 7 toward an axial end portion of the shaft 7 along the outside surface of the shaft 7 while the sleeve 41 rotates relative to the shaft 7 during drive of the motor 1, the lubricating oil is preferably prevented from leaking toward the axial end portion of the shaft 7 through the gap between the inside surface of the upper cone member 42 and the outside surface of the shaft 7.

In addition, as illustrated in FIGS. 2 and 6, an upper third inclined surface 427, which is inclined with respect to the central axis J1, is arranged in an axially lower end portion of the inside surface of the upper cone member 42. The radial distance between the upper third inclined surface 427 and the central axis J1 is preferably arranged to gradually increase with decreasing height. The upper third inclined surface 427 is arranged opposite to the outside surface of the shaft 7 with a gap intervening therebetween.

In the above-described process of inserting the shaft into the hole of the upper cone member 42, the shaft 7 is moved axially downward relative to the upper cone member 42. At this time, even if a portion of the adhesive A travels axially downward through the gap between the outside surface of the shaft 7 and the inside surface of the hole of the upper cone member 42, or a portion of the adhesive A arranged on the shaft travels to an axially lower end portion of the upper cone member 42, the adhesive A enters into a gap defined between the upper third inclined surface 427 and the outside surface of the shaft 7. The adhesive A closes at least a portion of the gap between the outside surface of the shaft 7 and the inside surface of the upper cone member 42. Note that the adhesive is preferably arranged to extend all the way around a circumference of the shaft 7 in the gap defined between the outside surface of the shaft 7 and the inside surface of the upper cone member 42.

Therefore, during driving of the motor 1, the lubricating oil is preferably prevented from entering into the gap between the outside surface of the shaft 7 and the inside surface of the hole of the upper cone member 42 along the outside surface of the shaft 7. This prevents the lubricating oil from leaking out along the shaft 7. Moreover, since the adhesive A enters into the gap defined between the upper third inclined surface 427 and the outside surface of the shaft 7, the likelihood that an excessive amount of the adhesive A will be adhered to the outside surface of the shaft 7 or the inside surface of the upper cone member 42 is reduced. Moreover, the adhesive A is prevented from closing the communicating hole 423, which enables the lubricating oil to circulate around the bearing mechanism 4 by passing through the communicating hole 423.

Figure 7:
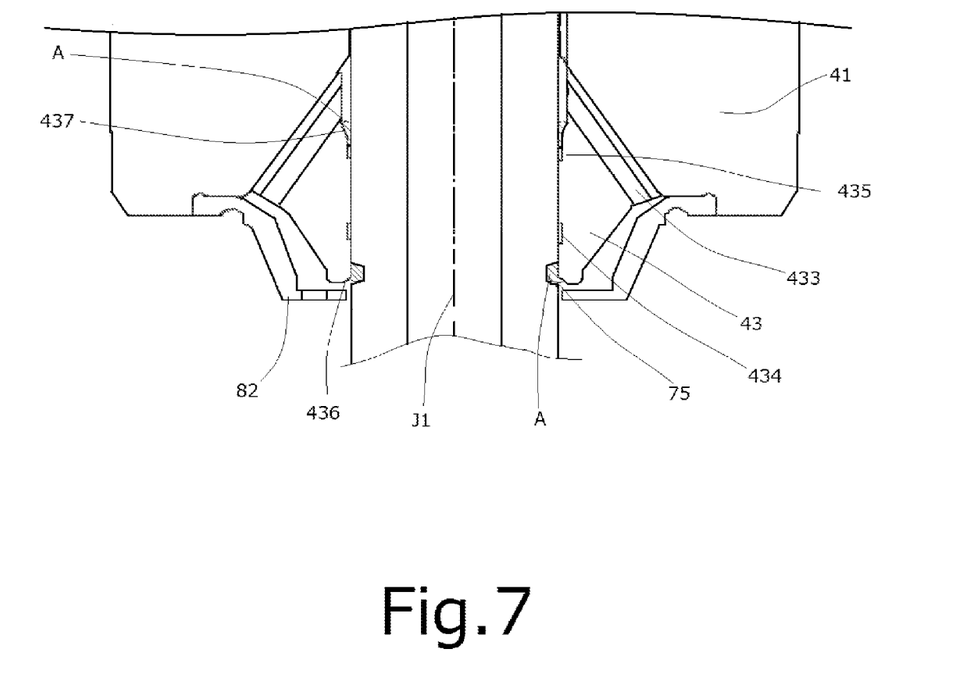
FIG. 7 is an enlarged view of a portion of the bearing and an adjacent area according to a preferred embodiment of the present invention.

FIG. 7 is an enlarged view of a portion of the bearing mechanism 4 and an adjacent area. As illustrated in FIGS. 1, 2, and 7, the lower shaft recessed portion 75 is arranged radially opposite an axially lower end portion of the lower cone member 43. The inside diameter of the lower cone member 43 is arranged to be smaller than the outside diameter of the shaft 7. Therefore, the lower cone member 43 is fixed to the shaft 7 through, for example, press fitting once the shaft 7 is inserted into a hole of the lower cone member 43 during the assemblage of the motor 1.

Moreover, an adhesive A is previously applied to an inside surface of the hole of the lower cone member 43 or the outside surface of the shaft 7 during the assemblage of the motor 1. The shaft 7 is thereafter preferably, for example, press fitted into the hole of the lower cone member 43. Accordingly, at least a portion of the adhesive is arranged between the inside surface of the hole of the lower cone member 43 and the outside surface of the shaft 7. That is, the lower cone member 43 is preferably fixed to the shaft 7 through adhesion as well.

In a process of inserting the shaft 7 into the hole of the lower cone member 43, a portion of the adhesive arranged between the outside surface of the shaft 7 and the inside surface of the hole of the lower cone member 43 travels axially upward or axially downward along the outside surface of the shaft 7 or the inside surface of the hole of the lower cone member 43. As illustrated in FIG. 7, at least a portion of a portion of the adhesive A which has traveled axially downward is arranged in a gap defined between the lower shaft recessed portion 75 and the inside surface of the hole of the lower cone member 43.

In the gap between the lower shaft recessed portion 75 and the lower cone member 43, a surface of the adhesive A is arranged at an axial height higher than an axial height of an axially upper end of the lower cone member 43. In other words, the axially lower end of the lower cone member 43 is positioned lower than the surface of the adhesive A.

Note that the axially lower end portion of the lower cone member 43 preferably includes a lower tapered surface 436 which is inclined with respect to the central axis J1. The lower tapered surface 436 is arranged radially opposite the lower shaft recessed portion 75. The radial distance between the central axis J1 and the lower tapered surface 436 is arranged to gradually increase with decreasing height. Furthermore, the lower tapered surface 436 is preferably arranged to extend all the way around an inner circumference of the axially lower end portion of the lower cone member 43.

Furthermore, a junction of the lower tapered surface 436 with the inside surface of the lower cone member 43 is arranged at an axial height higher than an axial height of the surface of the adhesive A. That is, an axially upper end of the lower tapered surface 436 is arranged at an axial height higher than an axial height of the surface of the adhesive A.

As illustrated in FIG. 7, the adhesive A arranged in the gap between the lower shaft recessed portion 75 and the inside surface of the hole of the lower cone member 43 closes at least a portion of a gap defined between the inside surface of the hole of the lower cone member 43 and the outside surface of the shaft 7. As a result, even if the lubricating oil travels from the vicinity of the axial middle portion of the shaft 7 toward an axial end portion of the shaft 7 along the outside surface of the shaft 7 while the sleeve 41 rotates relative to the shaft 7 during the drive of the motor 1, the lubricating oil is prevented from leaking toward the axial end portion of the shaft 7 through the gap between the inside surface of the lower cone member 42 and the outside surface of the shaft 7.

In addition, a lower third inclined surface 437, which is inclined with respect to the central axis J1, is arranged in an axially upper end portion of the inside surface of the lower cone member 43. The radial distance between the lower third inclined surface 437 and the central axis J1 is arranged to gradually decrease with increasing height. The lower third inclined surface 437 is arranged opposite to the outside surface of the shaft 7 with a gap intervening therebetween.

In the above-described process of inserting the shaft into the hole of the lower cone member 43, the shaft 7 is preferably moved axially downward relative to the lower cone member 43. At this time, even if a portion of the adhesive A travels axially upward through the gap between the outside surface of the shaft 7 and the inside surface of the hole of the lower cone member 43, or a portion of the adhesive A arranged on the shaft 7 travels to an axially upper end portion of the lower cone member 43, the adhesive A enters into a gap defined between the lower third inclined surface 437 and the outside surface of the shaft 7. The adhesive A closes at least a portion of the gap between the outside surface of the shaft 7 and the inside surface of the lower cone member 43.

Therefore, during the drive of the motor 1, the lubricating oil is prevented from entering into the gap between the outside surface of the shaft 7 and the inside surface of the hole of the lower cone member 43 along the outside surface of the shaft 7. This preferably prevents the lubricating oil from leaking out along the shaft 7. Moreover, since the adhesive A enters into the gap defined between the lower third inclined surface 437 and the outside surface of the shaft 7, the likelihood that an excessive amount of the adhesive A will be adhered to the outside surface of the shaft 7 or the inside surface of the lower cone member 43 is reduced. Moreover, the adhesive A is preferably prevented from closing the communicating hole 433, which enables the lubricating oil to circulate around the bearing mechanism 4 by passing through the communicating hole 433.

Note that, according to the present preferred embodiment, the shape of the upper cone member 42 and the shape of the lower cone member 43 are substantially the same. However, the shape of the upper cone member 42 may be different from the shape of the lower cone member 43.

While preferred embodiments of the present invention have been described above, the present invention allows a variety of modifications other than those mentioned above.

Note that each shaft recessed portion does not need to be entirely filled with the adhesive according to the above-described preferred embodiments.

In addition, the radial bottom portion of each shaft recessed portion may not necessarily be parallel or substantially parallel to the central axis J1. The radial bottom portion may be a curved surface or an uneven surface.

Each of the first and second axial side surfaces does not need to be an inclined surface. Each of the first axial side surfaces may be a curved surface or an uneven surface. Each of the second axial side surfaces may also be a curved surface or an uneven surface.

In each shaft recessed portion, the first axial side surface may be arranged to connect with the radial bottom portion either smoothly or so as to define an angle. The second axial side surface may be arranged to connect with the radial bottom portion either smoothly or so as to define an angle. The first axial side surface, the second axial side surface, and the radial bottom portion may be arranged to together define a single curved surface.

Each shaft recessed portion may be annular, extending in the circumferential direction. A plurality of shaft recessed portions may be arranged in the circumferential direction in each of the axially upper portion and the axially lower portion of the shaft 7. In this case, each shaft recessed portion may have the same shape, or alternatively, the shaft recessed portions may have different shapes.

Also note that each inclined surface of the sleeve 41 may be either an inclined surface which is inclined with respect to the central axis J1 or a curved surface which is curved. A groove which extends in the circumferential direction, and which is recessed in a radial direction, may be defined in a substantial axial middle portion of the inside surface of the sleeve 41. Also, a groove (for example, a herringbone groove or the like) which produces a fluid dynamic pressure in the lubricating oil may be defined in at least one of a portion of the sleeve 41 which is opposed to the upper cone member 42, a portion of the sleeve 41 which is opposed to the lower cone member 43, and a portion of the sleeve 41 which is opposed to the shaft 7.

Note that the stator core 221 may not necessarily be defined by laminated steel sheets. For example, the stator core 221 may be a core made from sintered metal powder or any other desirable type of stator core. The upper annular member may not necessarily be the upper cone member, but may be, for example, an annular member in the shape of a plate. Also, the lower annular member may not necessarily be the lower cone member, but may be, for example, an annular member in the shape of a plate.

The preferred embodiments of the present invention are applicable to motors for use in disk drive apparatuses, and also to motors used for other applications than the disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
   a stationary portion including a stator; and
   a rotating portion including a rotor magnet, and rotatably supported through a lubricating oil; wherein
   the stationary portion includes:
      a shaft centered on a central axis extending in a vertical direction; and
      an upper annular member arranged on an axially upper portion of the shaft, and including a hole through which the shaft is inserted;
   the rotating portion includes a sleeve including a central hole through which the shaft is inserted;
   the shaft includes a substantially annular upper shaft recessed portion defined in an outside surface of the shaft, arranged opposite to an inside surface of the hole of the upper annular member, and recessed radially inward from the outside surface;
   the lubricating oil is arranged to cover an inside surface of the central hole, the outside surface of the shaft, and a circumference of the upper annular member; and
   an adhesive is arranged in a gap defined between the upper shaft recessed portion and the inside surface of the hole of the upper annular member.

2. The spindle motor according to claim 1, wherein a surface of the adhesive is arranged at an axial height lower than an axial height of an axially upper end of the upper annular member.

3. The spindle motor according to claim 1, wherein the axially upper end of the upper annular member is positioned axially higher than a surface of the adhesive.

4. The spindle motor according to claim 1, wherein the adhesive is arranged to extend all a way around a circumference of the upper shaft recessed portion in the gap.

5. The spindle motor according to claim 1, wherein
   an axially upper end portion of the upper annular member includes an upper tapered surface inclined with respect to the central axis;
   the upper tapered surface is arranged radially opposite the upper shaft recessed portion; and
   a junction of the upper tapered surface with an inside surface of the upper annular member is arranged at an axial height lower than an axial height of a surface of the adhesive.

6. The spindle motor according to claim 5, wherein
   a radial distance between the central axis and the upper tapered surface is arranged to gradually increase with increasing height; and
   the upper tapered surface is arranged to extend all a way around an inner circumference of the axially upper end portion of the upper annular member.

7. The spindle motor according to claim 1, wherein the upper shaft recessed portion includes:
   an upper first axial side surface;
   an upper second axial side surface arranged on an axially lower side of the upper first axial side surface; and
   a radial bottom portion arranged to join the upper first axial side surface and the upper second axial side surface to each other.

8. The spindle motor according to claim 7, wherein an angle defined between the central axis and the upper first axial side surface is arranged to be equal to an angle defined between the central axis and the upper second axial side surface.

9. The spindle motor according to claim 7, wherein the outside surface of the shaft includes an upper first outside diameter portion arranged to connect with an end portion of the upper second axial side surface.

10. The spindle motor according to claim 9, wherein the upper first outside diameter portion is a portion of the shaft where an outside diameter of the shaft is arranged to be substantially constant.

11. The spindle motor according to claim 9, wherein
   the outside surface of the shaft includes an upper second outside diameter portion arranged on an axially lower side of the upper first outside diameter portion, and arranged to connect with the upper first outside diameter portion; and
   a radial distance between the central axis and the upper second outside diameter portion is arranged to gradually increase with decreasing height.

12. The spindle motor according to claim 11, wherein an outside diameter of the shaft in the upper first outside diameter portion is arranged to be equal or substantially equal to a minimum outside diameter of the shaft in the upper second outside diameter portion.

13. The spindle motor according to claim 11, wherein an axial length of the upper first outside diameter portion is arranged to be shorter than an axial length of the upper second outside diameter portion.

14. The spindle motor according to claim 11, wherein
   the outside surface of the shaft includes an upper third outside diameter portion arranged to connect with the upper second outside diameter portion; and
   an outside diameter of the shaft is arranged to be substantially constant in the third outside diameter portion.

15. The spindle motor according to claim 14, wherein a maximum outside diameter of the shaft in the second outside diameter portion is arranged to be equal or substantially equal to the outside diameter of the shaft in the upper third outside diameter portion.

16. The spindle motor according to claim 1, wherein
the upper annular member includes an upper third inclined surface inclined with respect to the central axis in an axially lower end portion of an inside surface of the upper annular member;
the upper third inclined surface is arranged opposite to the outside surface of the shaft with a gap intervening therebetween; and
the adhesive is arranged in a gap defined between the upper third inclined surface and the outside surface of the shaft.

17. The spindle motor according to claim 16, wherein the adhesive is arranged to extend all a way around a circumference of the shaft in the gap defined between the upper third inclined surface and the outside surface of the shaft.

18. The spindle motor according to claim 1, wherein
the upper annular member is substantially tubular; and
the upper annular member includes:
an upper first inclined surface arranged in an axially lower portion of an outside surface of the upper annular member, and inclined with respect to the central axis; and
an upper second inclined surface arranged in an axially upper portion of the outside surface of the upper annular member, and inclined with respect to the central axis.

19. The spindle motor according to claim 1, wherein the shaft is press fitted to the upper annular member.

20. The spindle motor according to claim 19, wherein the adhesive is arranged between the inside surface of the hole of the upper annular member and the outside surface of the shaft.

21. The spindle motor according to claim 1, wherein
the stationary portion further includes a lower annular member arranged on an axially lower portion of the shaft, and including a hole through which the shaft is inserted;
the shaft includes a substantially annular lower shaft recessed portion defined in the outside surface of the shaft, arranged opposite to an inside surface of the hole of the lower annular member, and recessed radially inward from the outside surface; and
an adhesive is arranged in a gap defined between the lower shaft recessed portion and the inside surface of the hole of the lower annular member.

22. The spindle motor according to claim 21, wherein a surface of the adhesive is arranged at an axial height higher than an axial height of an axially lower end of the lower annular member.

23. The spindle motor according to claim 21, wherein an axially lower end of the lower annular member is positioned axially lower than a surface of the adhesive.

24. The spindle motor according to claim 21, wherein the adhesive is arranged to extend all a way around a circumference of the lower shaft recessed portion in the gap defined between the lower shaft recessed portion and the inside surface of the hole of the lower annular member.

25. A disk drive apparatus comprising the spindle motor of claim 1.

* * * * *